MICHAEL HUMENIK, JR.
DAVID MOSKOWITZ
INVENTORS

BY John R. Faulkner
Thomas H. Oster
ATTORNEYS

May 21, 1968  M. HUMENIK, JR., ET AL  3,384,465
IRON BONDED TUNGSTEN CARBIDE
Filed June 22, 1967  5 Sheets-Sheet 3

MICHAEL HUMENIK, JR.
DAVID MOSKOWITZ
INVENTORS

BY John R. Faulkner
Thomas H. Oster
ATTORNEYS

MICHAEL HUMENIK, JR.
DAVID MOSKOWITZ
INVENTORS

United States Patent Office 3,384,465
Patented May 21, 1968

3,384,465
IRON BONDED TUNGSTEN CARBIDE
Michael Humenik, Jr., Allen Park, and David Moskowitz, Oak Park, Mich., assignors to Ford Motor Company, Dearborn, Mich., a corporation of Delaware
Continuation-in-part of application Ser. No. 557,397, June 14, 1966. This application June 22, 1967, Ser. No. 653,293
1 Claim. (Cl. 29—182.8)

ABSTRACT OF THE DISCLOSURE

This invention teaches a hard high strength sintered compact which is basically tungsten carbide bonded by an alloy of iron and nickel. The nickel content of the bonding alloy is responsible for transverse rupture strengths as high as 600,000 pounds per square inch.

Figure 1:
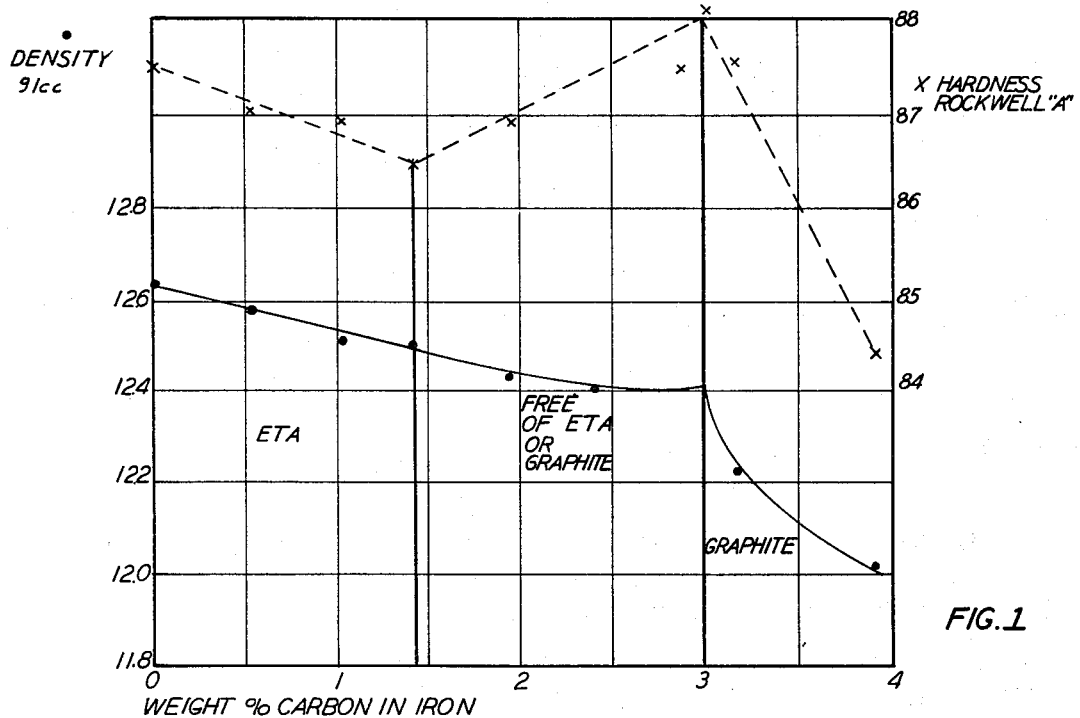

This application is a continuation-in-part of our co-pending application Ser. No. 557,397, filed June 14, 1966, and now abandoned.

This invention is concerned with an extremely strong and hard tungsten carbide compact, and with a method for producing such a compact. This invention is especially directed to means for controlling the composition of tungsten carbide compacts to attain physical properties which are currently unique.

These currently unique physical properties are to be obtained with iron bonded tungsten carbide compacts only if two basic precautions are observed. The first precaution is that the total carbon content of the compact be adjusted to preclude the formation of a harmful double carbide of iron and tungsten $W_3Fe_3C$ which is referred to hereinafter as the eta phase and also to prevent the precipitation of free graphite in the finished product. The second necessary precaution is that the tungsten carbide grain size in the final product be substantially all less than five microns. Those skilled in this art will recognize that this is to be obtained by a known correlation of the initial grain size and the sintering time and temperature.

The results to be obtained from compacts in which tungsten carbide is bonded with iron can be substantially improved by the substitution of nickel or nickel and cobalt for a portion of the iron. The physical properties of these compacts may be further improved by appropriate thermal treatment.

It is well known that the mechanical properties of sintered tungsten carbide-cobalt alloys are critically dependent upon carbon content. Only when the carbon content corresponds closely to the theoretical value for WC, i.e., 6.1 weight percent, are optimum mechanical properties as well as product performance obtained. It is found that deviation from this carbon content, whether in excess or in deficiency, results in the appearance of a third phase, with consequent inferior properties. In the case of a carbon excess, the third phase that appears is graphite, with a resultant lowering of strength and hardness. Deficiency of carbon below the stoichiometric value for WC, on the other hand, produces the double carbide $W_3Co_3C$, with markedly inferior strength and impact resistance.

As an example of the marked effect of small changes in carbon content on transverse rupture strength, the following values are given by Gurland (Trans. AIME, 200, 285 (1954)) for an 84 WC–16 Co alloy:

| Carbon Content (wt. percent) | Carbon Deficiency or Excess (wt. percent) | Transverse Rupture Strength (p.s.i.) |
|---|---|---|
| 5.9 | .2 deficiency | 280,000 |
| 6.0 | .1 deficiency | 310,000 |
| 6.1 | Theoretical | 375,000 |
| 6.2 | .1 excess | 360,000 |
| 6.4 | .3 excess | 330,000 |

Gurland summarizes as follows:

"The carbon content of WC-Co alloys very strongly influences the properties of sintered compacts. A deficiency of carbon will affect the properties much more drastically than an excess of carbon because of the formation of the double carbide $W_3Co_3C$. The $\eta$ carbide reduces the strength of displacing the binder from the sintered structure."

If sintered tungsten carbide-iron alloys are prepared by identical manner to that used in the preparation of tungsten carbide-cobalt alloys of optimum strength, so that WC of theortical carbon content is bonded with Fe, it is found that the transverse rupture strength is only about half of that obtained from the analogous WC-Co composite. The reason for this is that a deleterious third phase, $W_3Fe_3C$, is invariably present, notwithstanding the fact that WC of theoretical carbon content was used. The inability to prevent formation of the brittle double carbide $W_3Fe_3C$ explains the lack of success in attempts to replace Co with Fe in WC-base materials. According to Schwarzkopf and Kieffer ("Cemented Carbides," MacMillan, New York, (1960), p. 188):

"Iron- or nickel-bonded tungsten carbide exhibited not more than about 40–60% of the transverse-rupture strength of Co-bonded material, and this inferiority of Fe and Ni was explained by their higher solid solubility for tungsten carbide, and their tendency toward formation, of brittle double carbides (ternary compounds of the type $Ni_xW_yC_z$ or $Fe_xW_yC_z$, respectively)."

We have observed that formation of the deleterious $W_3Fe_3C$ phase in Fe-WC composites can be completely inhibited by specified additions of excess carbon to the iron or iron-base alloy binder, over and above the amount present in association with the WC. Tungsten carbide bonded with iron or iron-base alloys, that has an average carbide particle size less than 5 microns and is produced in the manner described below, contains neither $W_3Fe_3C$ nor graphite as a third phase, and exhibits outstanding mechanical properties.

FIGURE 1 is a graphical showing of the amount of carbon required in the iron bonding metal in a compact in which the ratio of the weight of tungsten carbide to iron is three to one. As is shown in the figure, additions of free carbon to the WC-Fe mixture of from 1.4 up to 3.0 weight percent of the iron present result in specimens free of either eta or graphite phases.

The marked effect of carbon content on the transverse rupture strength of 75 WC/25 Fe samples is shown in Table I. This table shows the results of transverse rupture tests of 3 materials, all of which have an average WC particle size of less than 5μ, but in which 0, 1.4 and 3.9 weight percent carbon, respectively, is present associated with the iron.

TABLE I.—EFFECT OF CARBON CONTENT OF 75 WC/25 Fe SPECIMENS ON TRANSVERSE RUPTURE STRENGTH

| Percent C in Fe | Average Transverse Rupture Strength, p.s.i. | Phases Observed |
|---|---|---|
| 0 | 247,900 | η+Fe+WC |
| 1.4 | 415,200 | Fe+WC |
| 3.9 | 248,800 | Graphite+Fe+WC |

Figure 2:
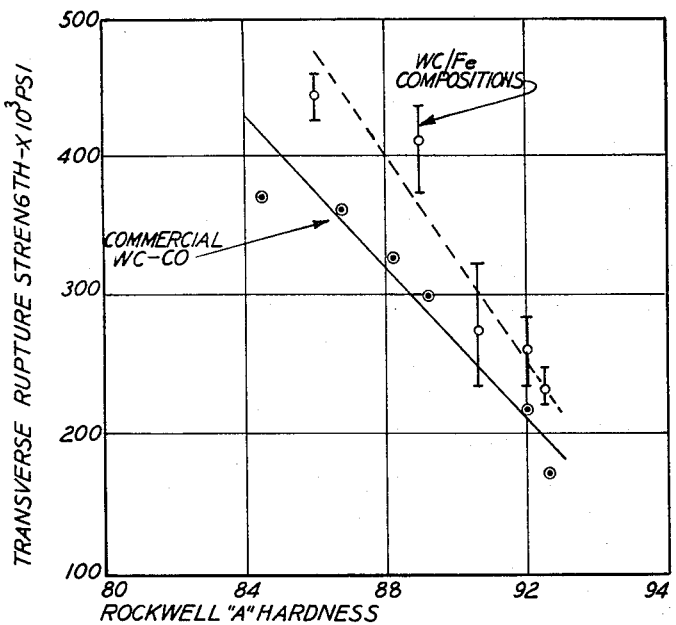

FIGURE 2 shows the transverse rupture strength vs. Rockwell "A" hardness of similarly prepared WC/Fe materials at various Fe binder levels. Analogous values for commercially-available WC/Co materials are also shown.

The following procedure has been followed to produce an iron bonded tungsten carbide compact having a tungsten carbide to iron ratio of about three to one. A material containing approximately 25 weight percent iron and 75 weight percent tungsten carbide was prepared in the following manner: 74.6 parts of tungsten carbide powder, less than 3 microns in average particle size and containing 6.1 weight percent combined carbon and substantially no free carbon, was added to a stainless steel ball mill loaded with tungsten carbide-base balls, together with 24.8 parts of electrolytic iron powder, less than 325 mesh in particle size, and .60 part of a spectroscopically pure grade of graphite powder. Benzene was added to the mill in sufficient quantity to cover the charge, and then this mixture was ball-milled for 3 days. The milled slurry was then extracted from the mill, and an amount of "Carbowax 600" polyethylene glycol, corresponding to 1½ percent of the total weight of the powder prior to milling, was added to the slurry and stirred into it.

After complete evaporation of the benzene at room temperature, the powder was screened through a 20 mesh sieve and pressed into specimens of approximate dimensions 1¼" x 5/16" x ¼" by compressing in a die at 20,000 p.s.i. The polyethylene glycol lubricant was removed by heating the specimens, placed on graphite trays, to 750° F. under a dry hydrogen atmosphere, having a dew point less than −80° F., and holding them at this temperature for 30 minutes.

The specimens were then placed on 99% pure aluminum oxide trays, upon which a fine layer of 100 mesh titanium carbide crystallites have been sprinkled. These trays were loaded into a molybdenum crucible which was then heated under a vacuum of less than one micron to 2600° F. and held there for one hour.

Similar procedures to the above are used in the preparation of iron-bonded tungsten carbide materials containing different amounts of binder.

The necessity for avoiding both the eta phase and graphite is just as necessary in the case of compacts employing an iron nickel bonding metal as with the pure iron bonding metals. This fact can readily be deduced from the following table:

EFFECT OF CARBON CONTENT OF 75 WC/25 (80 Fe/20 Ni) SPECIMENS ON TRANSVERSE RUPTURE STRENGTH

| Wt. Percent Carbon Added 80 Fe/20 Ni | Average Transverse Rupture Strength (p.s.i.) | Phases Observed |
|---|---|---|
| 0 | 311,000 | η+Fe-Ni+WC |
| 1.4 | 607,000 | Fe-Ni+WC |
| 2.9 | 365,000 | Graphite+Fe-Ni+WC |

For any specific Fe:Ni bonding metal ratio, there is an optimum range of excess carbon addition within which neither η nor graphite phases appear. Table II lists excess carbon additions for each Fe:Ni ratio that are within this optimum range for one specific set of sintering conditions.

TABLE II.—CARBON ADDITIONS MADE TO WC/Fe-Ni PRODUCING MATERIALS CONTAINING NEITHER η PHASE NOR GRAPHITE

| Binder Fe:Ni ratio, wt. percent: | Carbon addition, wt. percent of binder |
|---|---|
| 100:0 | 2.9 |
| 95:5 | 2.5 |
| 90:10 | 2.2 |
| 85:15 | 1.8 |
| 80:20 | 1.4 |
| 75:25 | 1.4 |
| 70:30 | 1.4 |
| 60:40 | .96 |

Figure 3:
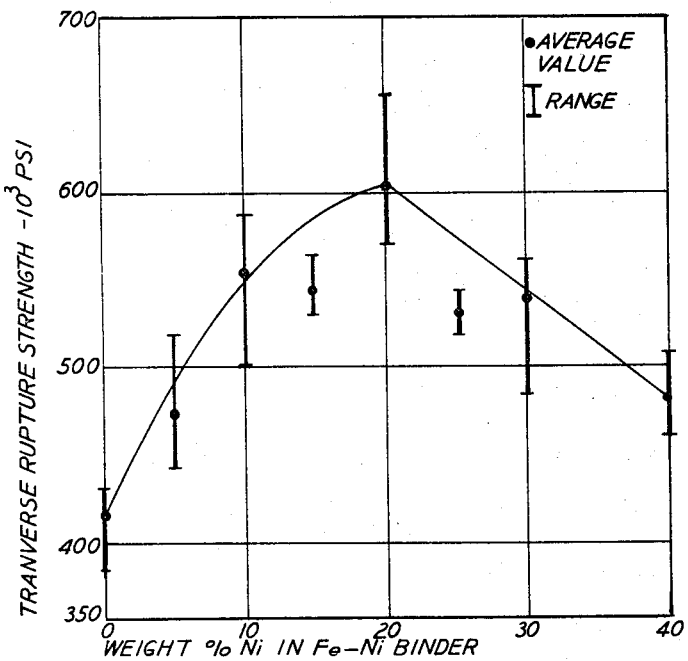

FIGURE 3 is a graphical showing of the effect on the transverse rupture strength of replacing a part of the iron in the compact of FIGURE 1 by nickel. The excess carbon additions made to the compositions of FIGURE 2 were shown in Table II.

Figure 4:
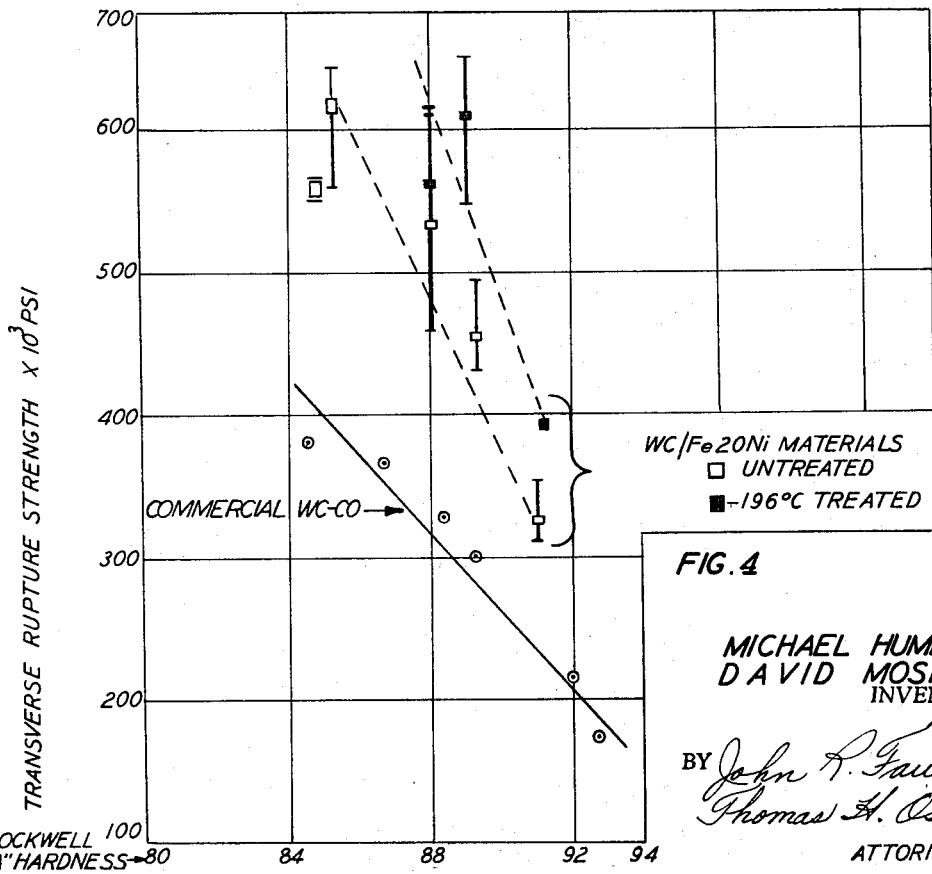

An additional aspect of the Fe-Ni bonded WC materials described above, which provides superiority over commercially available Co-bonded materials, is the fact that they are hardenable in the sintered condition via martensitic transformation of the binder. If specimens whose binder contains from 10% through 25% Ni are cooled to a temperature below the $M_s$ temperature (the temperature at which martensite starts to form on cooling) for that composition a significant increase in Rockwell "A" hardness is found to take place. As a consequence, even higher strengths can be obtained at given hardness levels by subjecting specimens to temperatures below their binders' $M_s$ temperatures prior to testing. FIGURE 4 shows the transverse rupture strength vs. Rockwell "A" hardness of some WC/Fe 20 Ni materials in both untreated as well as liquid-nitrogen-temperature treated conditions.

Figure 5:
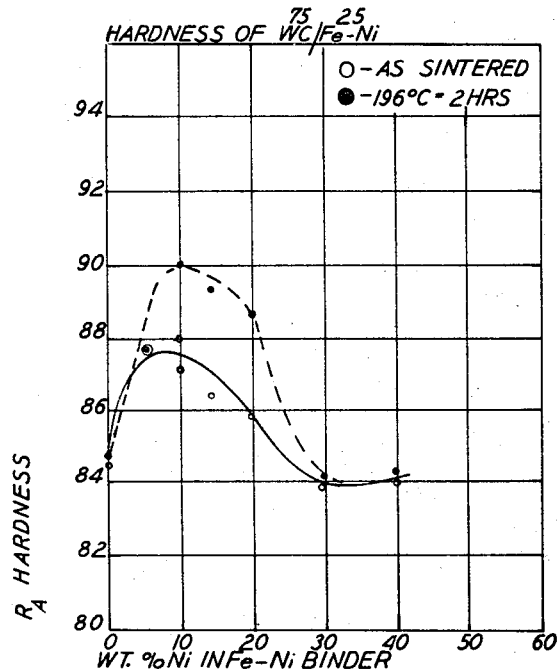

FIGURE 5 is a further showing of the effect of the nickel iron substitution shown in FIGURE 3 and is directed to hardness values, both as sintered and as treated for two hours in liquid nitrogen.

Furthermore, substitution of cobalt for a portion of the nickel in Fe-Ni bonded WC has a hardening effect. Since addition of Co increases the $M_s$ temperature of Fe-Ni alloys, addition of this element sufficient to increase the $M_s$ temperature to above room temperature produces a hardening effect resulting from a portion of the binder's transformation into martensite.

Figure 6:
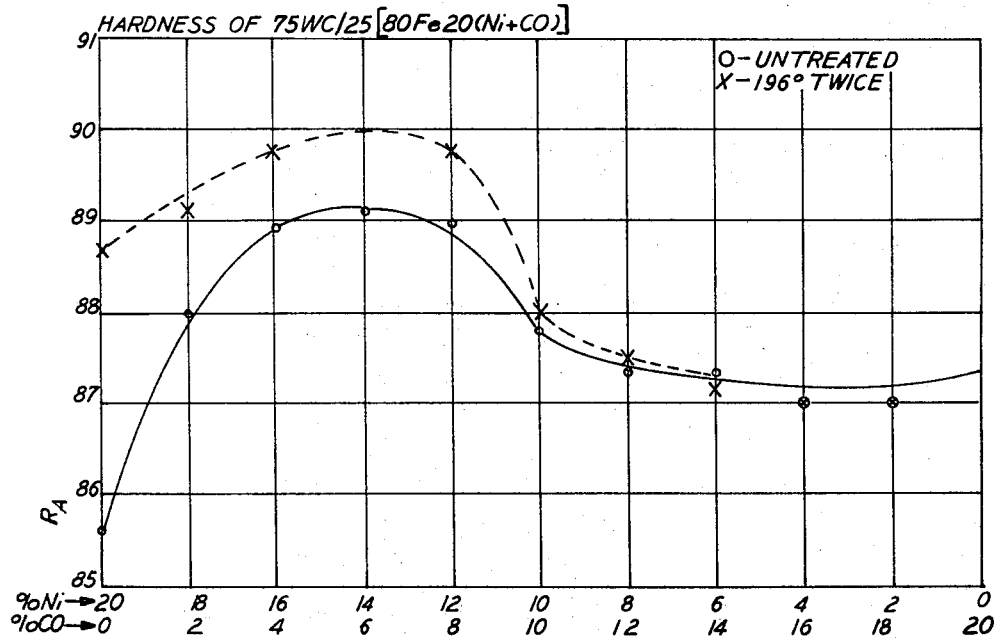
Figure 7:
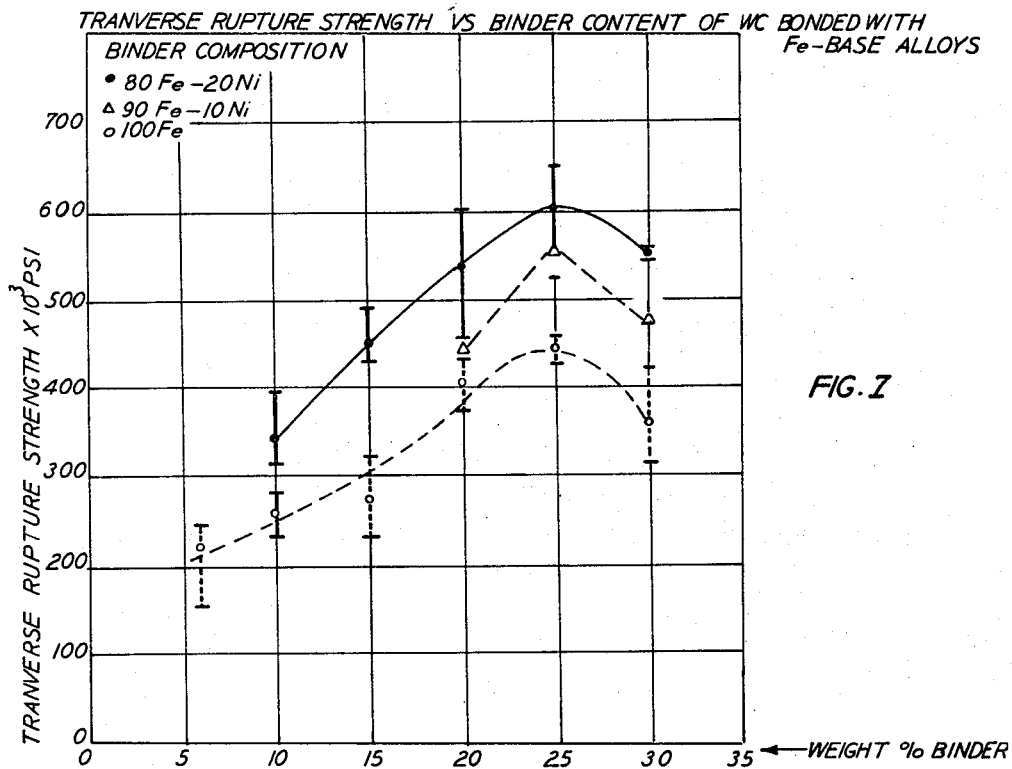
Figure 8:
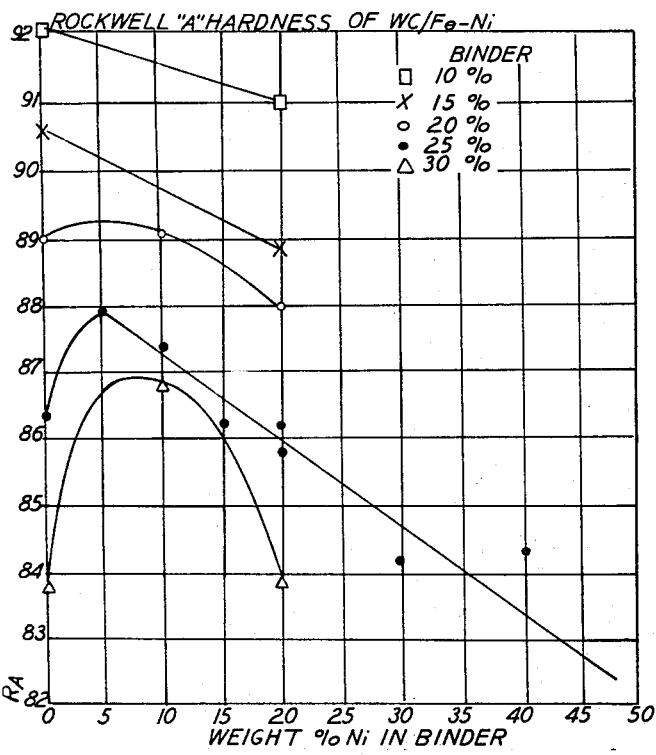

FIGURE 6 is a further showing of the composition of FIGURE 5 in which the iron in the bonding metal has been replaced by alloys of nickel and cobalt; and FIGURE 7 is a graphical showing of the effects upon the transverse rupture strength of varying the ratio of tungsten carbide to bonding metal employing three separate binding metals; and, FIGURE 8 is a showing similar to FIGURE 5 and showing the results upon hardness of varying the ratio between tungsten carbide and binding metal and considering four separate levels of binding metal and a variety of ratios between nickel and iron in the binding metal.

Figure 9:
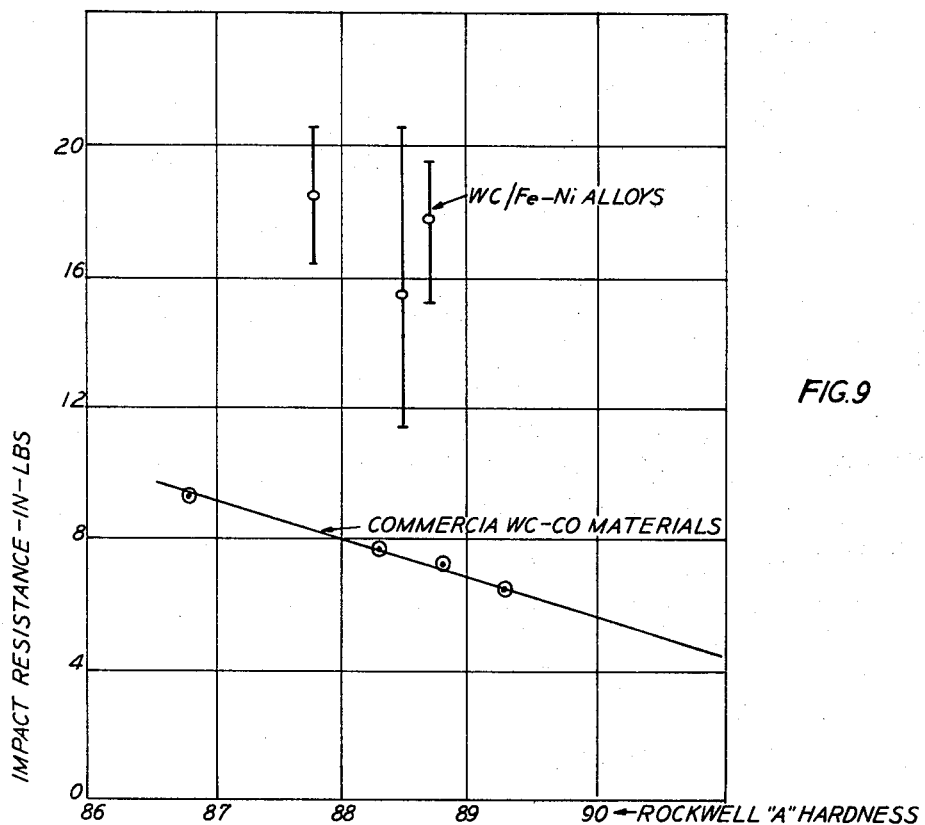

FIGURE 9 is a showing of the drop-weight test impact resistance vs. Rockwell "A" hardness of several WC/Fe-Ni materials as compared with commercial grades of WC-Co.

Figure 10:
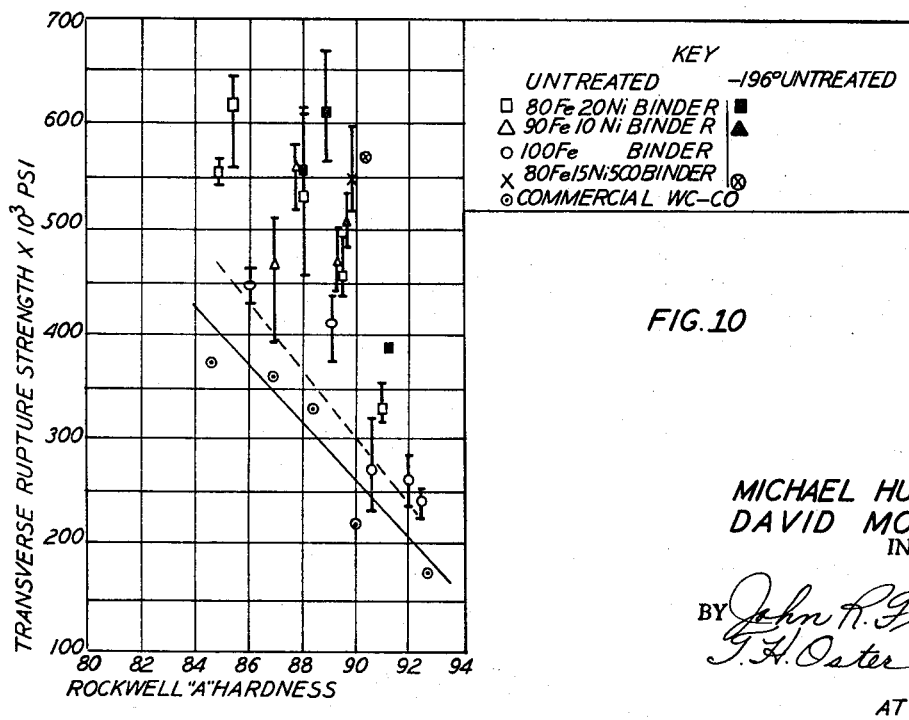

It should be pointed out that the hardness and strength of this material, when taken together, represents a unique combination of properties superior to that possessed by commercially-available cemented carbides. FIGURE 10 is a composite plot of the transverse rupture strength vs. Rockwell "A" hardness of some of the above described compositions as well as commercial WC-Co materials.

It is felt that the high levels of both strength and hardness of the compositions described above represent a unique combination of properties that should prove exceedingly desirable in areas in which presently available cemented carbides have found commercial application.

Background material relating to this invention may be obtained in a publication entitled Cemented Carbides by Schwarzkopf and Kieffer, 1960 at pages 188 to 191 and in Neue Hutte 2, 537 et seq, 1957. Reference is also made to United States Patent 3,245,763 issued Apr. 12, 1966.

We claim as our invention:

1. A high strength hard sintered compact consisting essentially of tungsten carbide and a bonding metal consisting essentially of iron alloyed with nickel, the total carbon content of the compact being adjusted to assure the substantial absence of an eta phase and of deleterious amounts of graphite, substantially all of the grains of the sintered tungsten carbide having a grain size of not over five microns, the nickel content of the bonding metal being between five and forty percent by weight.

References Cited

UNITED STATES PATENTS

| | | | |
|---|---|---|---|
| 2,731,711 | 1/1956 | Lucas | 29—182.8 |
| 3,245,763 | 4/1966 | Ohlsson | 29—182.7 |

FOREIGN PATENTS 908,412  10/1962  Great Britain.

OTHER REFERENCES

Schwarzkopf et al., "Cemented Carbides," MacMillan Company, New York, 1960, pp. 188–190.

L. DEWAYNE RUTLEDGE, *Primary Examiner.*

R. L. GRUDZIECKI, *Assistant Examiner.*